United States Patent
Wu

Patent Number: 6,017,052
Date of Patent: Jan. 25, 2000

[54] FOLDING COLLAPSIBLE FRAME ASSEMBLY FOR A GOLF CART

[76] Inventor: David Wu, No. 35-1, Jih Hsin Street, Tu Cheng Hsiang, Taipei Hsien, Taiwan

[21] Appl. No.: 09/063,363

[22] Filed: Apr. 21, 1998

[51] Int. Cl.[7] .................................................. G02B 25/00
[52] U.S. Cl. ..................... 280/646; 280/652; 280/DIG. 6
[58] Field of Search .............................. 280/DIG. 6, 645, 280/646, 652; 248/96, 97, 124.1, 125.1; 16/900, 430

[56] References Cited

U.S. PATENT DOCUMENTS

| | | | |
|---|---|---|---|
| 4,936,598 | 6/1990 | Lee | 280/645 |
| 5,074,577 | 12/1991 | Kim | 280/646 |
| 5,143,399 | 9/1992 | Liu | 280/652 X |
| 5,180,087 | 1/1993 | Lee | 280/DIG. 6 X |
| 5,201,540 | 4/1993 | Wu | 280/646 |
| 5,249,822 | 10/1993 | Wu | 280/646 |
| 5,281,044 | 1/1994 | Chen | 280/DIG. 6 |
| 5,409,253 | 4/1995 | Cheng | 280/646 |
| 5,464,238 | 11/1995 | Wu | 280/646 X |
| 5,496,054 | 3/1996 | Wu | 280/646 |
| 5,526,894 | 6/1996 | Wang | 280/646 |
| 5,582,372 | 12/1996 | Wu | 280/DIG. 6 X |
| 5,667,239 | 9/1997 | Yang | 280/646 |
| 5,704,629 | 1/1998 | Wu | 280/652 |

*Primary Examiner*—Lanna Mai
*Assistant Examiner*—Toan To
*Attorney, Agent, or Firm*—Varndell & Varndell, PLLC

[57] ABSTRACT

A folding collapsible frame assembly for a golf cart in which a locating block is pivotably mounted in an opening between two parallel walls of upper bag cradle being fixedly fastened to the front end of a main shaft, a spring is mounted in the opening in the upper bag cradle to support the locating block, a handle bracket is pivoted to the upper bag cradle to hold a handle bar and turned about an axis between a first position where the handle bracket is received in a receiving chamber in the upper bag cradle to hold the handle bar in longitudinal alignment with the main shaft and a locating flange of the handle bracket is forced into engagement with a locating groove on the locating block, and a second position where the locating flange of the handle bracket is disengaged from the locating groove of the locating block and the handle bracket is moved out of the receiving chamber and retained in parallel to the main shaft.

1 Claim, 5 Drawing Sheets

FOLDING COLLAPSIBLE FRAME ASSEMBLY FOR A GOLF CART

BACKGROUND AND SUMMARY OF THE INVENTION

The present invention relates to a frame assembly for a golf cart, and more particularly to a folding collapsible frame assembly for a golf cart.

Various golf carts have been disclosed having a folding collapsible frame assembly. Exemplars are seen in U.S. Pat. Nos. 5,249,822; 5,464,238; 5,582,372; 5,704,629. The telescopic and folding frame assembly of U.S. Pat. No. 5,249,822 includes a folding frame bar mounting structure and a telescopic drag bar mounting structure. The structure of telescopic and folding frame assembly is functional, however the procedure of collapsing the telescopic and folding frame assembly is complicated. Furthermore, the spring which retains the locking plate wear quickly with use. The angle-adjustable folding frame assembly of U.S. Pat. No. 5,464,238 includes a handle having a handle connector at one end pivoted to the handle bracket and wheel bracket on the main frame of a golf cart, a first locating member made to slide on the handle and having a positioning rod, a slide block connected to the first locating member and moved to slide on the handle connector, a spring stopped between the handle connector and the first locating member, and a second locating member affixed to the front end of the main frame and having two spaced retaining grooves for alternatively receiving the positioning rod of the first locating member in holding the handle in a first or second working position. The main drawback of the angle-adjustable folding frame assembly of U.S. Pat. No. 5,464,238 is that the parts tend to be moved to rub against one another during the movement of the golf cart, thereby causing a big noise to be produced. If the locating members are heavily oscillated, the mounting screws may fall from the folding frame assembly, causing the parts of the folding frame assembly to be damaged. The folding collapsible golf cart frame assembly of U.S. Pat. No. 5,582,372 includes a main shaft to hold two bag cradles, a handle bracket and a wheel holder bracket fixed to the main shaft, handle bar having a connecting block at one end pivoted to the handle bracket, two links pivotally connected between a wheel holder on the wheel holder bracket and the connecting block, a locating block fixed to the main shaft, a locking plate slidably mounted on the handle bar and having a retainer block for fastening to the locating block to hold the handle bar in the operative position, and two springs connected between the connecting block and the locking plate. This structure of folding collapsible golf cart frame assembly is complicated. The assembly process of the folding collapsible golf cart frame assembly takes much time to finish. The procedure of operating the folding collapsible golf cart frame assembly from the operative position to the collapsed manner is also complicated. The folding collapsible frame assembly of U.S. Pat. No. 5,704,629 is also complicated, and inconvenient to be set between the operative position and the collapsed position. Furthermore, according to the aforesaid conventional folding collapsible frame structures, the main shaft and the handle bar are not longitudinally aligned when set into the operative position. This drawback destroys the sense of beauty of the golf cart, and makes the size of the golf cart unable to be greatly reduced.

The present invention has been accomplished to provide a folding collapsible frame assembly for a golf cart which eliminates the aforesaid drawbacks. According to one aspect of the present invention, the folding collapsible frame assembly comprises a main shaft holding an upper bag cradle and a lower bag cradle, a locating block pivotably mounted in an opening between two parallel walls of an upper bag cradle being fixedly fastened to a front end of the main shaft, a spring mounted in an opening in the upper bag cradle to support the locating block, a handle bracket pivoted to the upper bag cradle to hold a handle bar and turned about an axis between a first position where the handle bracket is received in a receiving chamber in the upper bag cradle to hold the handle bar the operative position and a locating flange of the handle bracket is forced into engagement with a locating groove on the locating block, and a second position where the locating flange of the handle bracket is disengaged from the locating groove of the locating block and the handle bracket is moved out of the receiving chamber and retained in parallel to the main shaft. According to another aspect of the present invention, the handle bar is retained in longitudinal alignment with the main shaft when the handle bracket is turned to the first position. According to still another aspect of the present invention, the locating flange of the handle bracket can be conveniently disengaged from the locating groove on the locating block by pressing down the locating block against the spring with one hand, enabling the handle bar to be turned with the handle bracket to the collapsed position.

DETAILED DESCRIPTION OF THE PREFERRED EMBODIMENT

Figure 1:
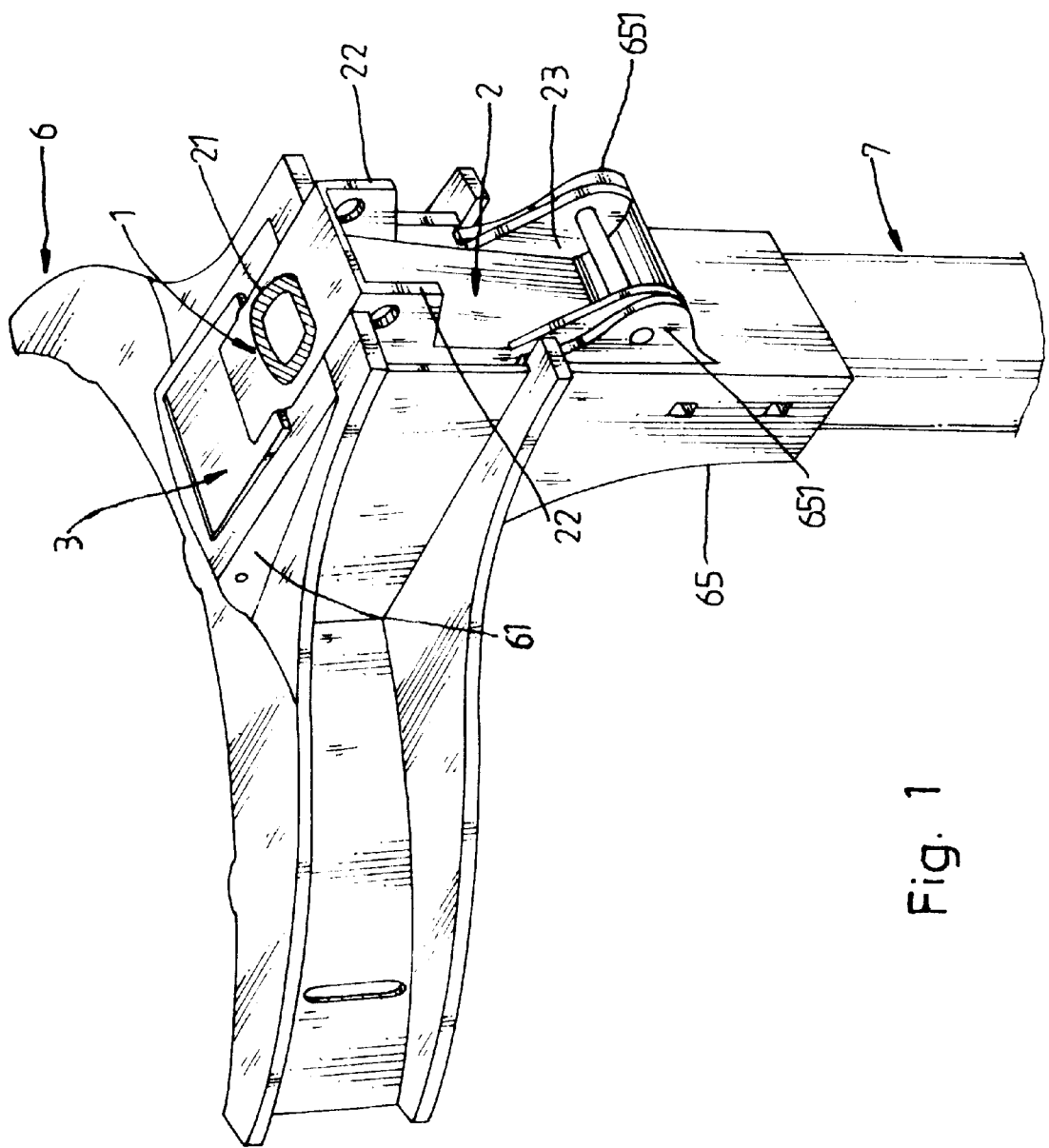
FIG. 1 is a perspective view of a part of the present invention.

Referring to Figures from 1 to 5, a folding collapsible frame assembly for a golf cart in accordance with the present invention is generally comprised of a handle bar 1, a handle bracket 2, a locating block 3, a main shaft 7, a wheel holder bracket 4, two links 5, an upper bag cradle 6, and a lower bag cradle (not shown). The handle bar 1 has a bottom end fixedly connected to the handle bracket 2. The handle bracket 2 comprises a coupling hole 21 which receives the bottom end of the handle bar 1, two parallel lugs 22 raised from the rear side thereof two which the links 5 are respectively pivoted, a coupling portion 23 at the front side thereof, and a locating flange 24 for insertion into a locating groove 34 on the locating block 3. The upper bag cradle 6 and the lower bag cradle are respectively fastened to front and rear ends of the main shaft 7. The wheel holder bracket 4 is fixedly fastened to the main shaft 7 and spaced between the upper bag cradle 6 and the lower bag cradle, having two parallel lugs 41. The links 5 each have a front end 51 respectively pivoted to the lugs 22 of the handle bracket 2 and a rear end 52 respectively pivoted to the lugs 41 of the wheel holder bracket 4.

Figure 3:
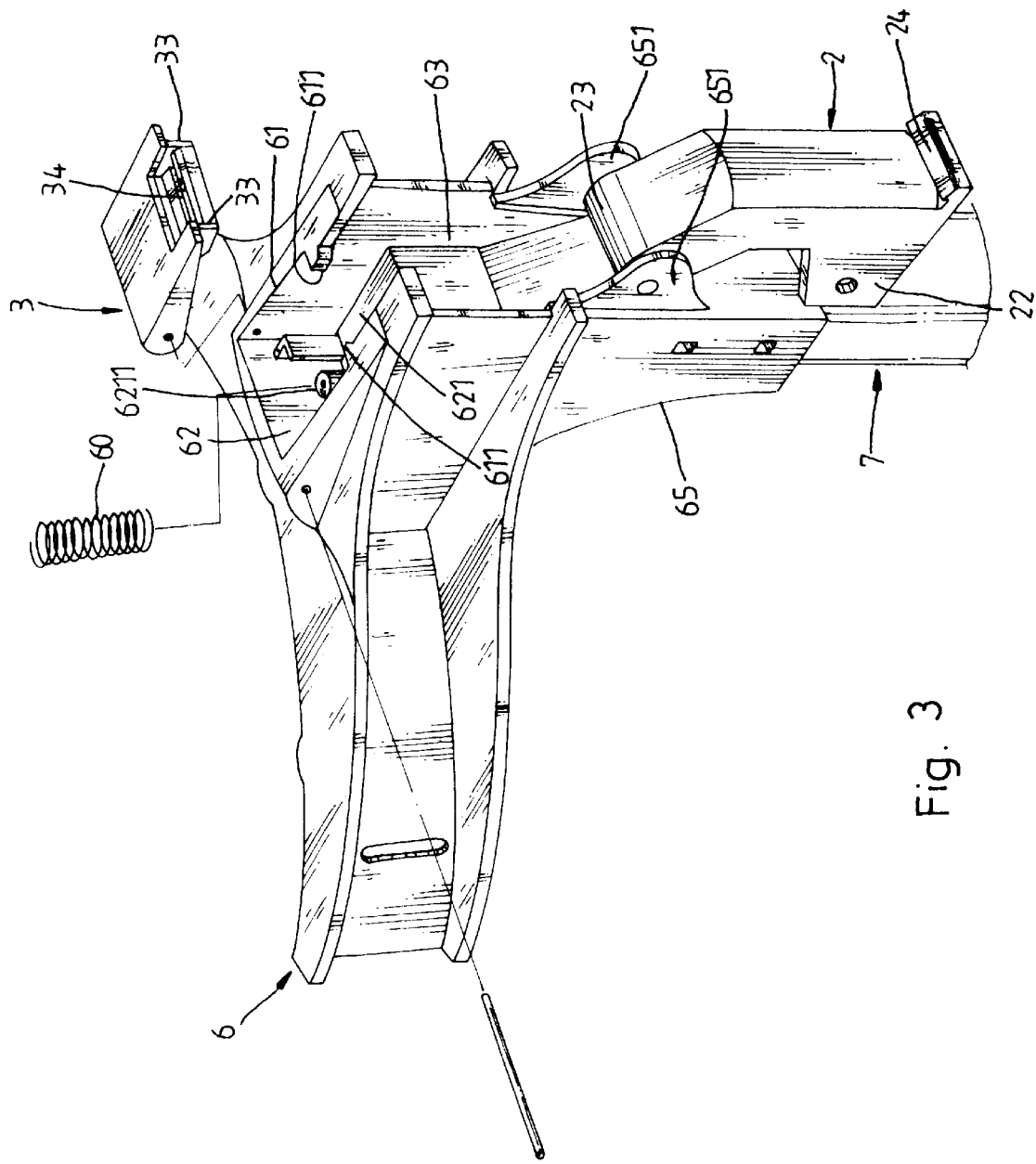
FIG. 3 is an exploded view of the assembly shown in FIG. 2.

The main characteristics of the present invention are outlined hereinafter with reference to Figures from 1 to 5 again. The upper bag cradle 6 comprises two longitudinal mounting walls 61 arranged in parallel at the front side to which the locating block 3 is pivoted, a transverse inside wall 621, an opening 62 surrounded by the longitudinal mounting walls 61 and the transverse inside wall 621 which receives the locating block 3, a rod 6211 raised from the transverse inside wall 621 within the opening 62, a spring 60 mounted on the rod 6211, two stop flanges 611 respectively perpendicularly raised from the longitudinal mounting walls 61 to limit the upward turning angle of the locating block 3, a receiving chamber 63 at the bottom side thereof in communication with the opening 62 for receiving the handle bracket 2, a shell 65 at the back side thereof fastened to the front end of the main shaft 7, and two parallel lugs 651 integral with the shell 65 at one end of the receiving chamber 63 to which the coupling portion 23 of the handle bracket 2 is pivotably connected by pivot means. The coupling portion 23 can be turned with the handle bracket 2 about an axis within 180° between a first position where the handle bracket 2 is received in the receiving chamber 63 as shown in FIG. 1, and a second position where the handle bracket 2 is moved out of the receiving chamber 63 and retained in parallel to the main shaft 7 as shown in FIG. 3.

The locating block 3 has a front end pivotably connected between the longitudinal mounting walls 61 of the upper bag cradle 6. The aforesaid locating groove 34 is provided at the rear end of the locating block 3. The bottom side wall (not shown) of the locating block 3 is supported on the spring 60. The locating block 3 further comprises two stop flanges 33 bilaterally disposed at the rear end. When the locating block 3 is turned upwards, the stop flanges 33 of the locating block 3 are stopped by the stop flanges 611 of the upper bag cradle 6 to limit the upward turnin angle of the locating block 3.

Figure 4:
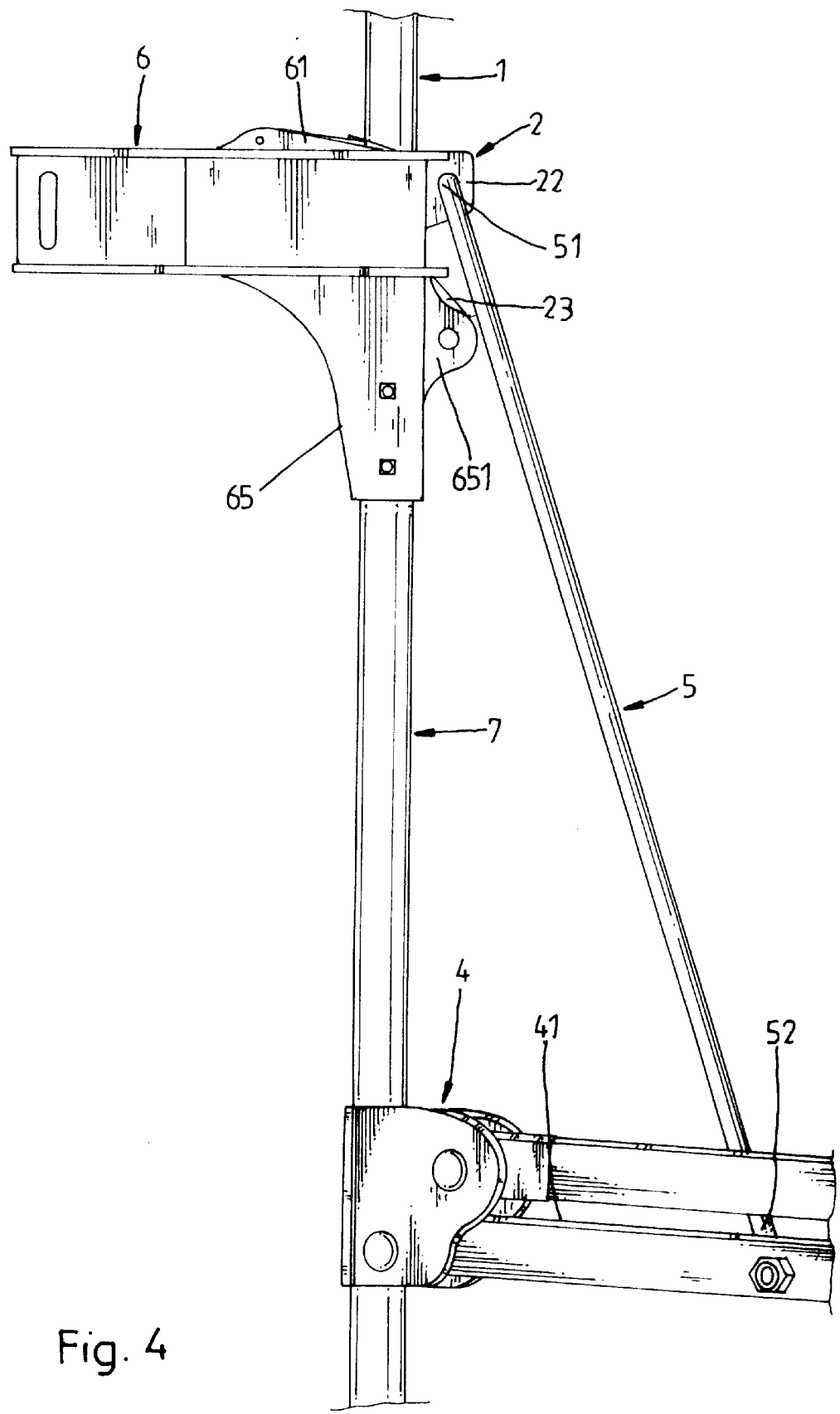
FIG. 4 is a side view of the present invention, showing the folding collapsible frame assembly set into the extended position.

As indicated above, the coupling portion 23 of the handle bracket 2 is pivotably connected between the lugs 651 at the shell 65 of the upper bag cradle 6. When the handle bracket 2 is turned to the first position and received in the receiving chamber 63, the locating flange 24 of the handle bracekt 2 is forced into engagement with the locating groove 34 on the locating block 3 to hold the handle bar 1 in longitudinal alignment with the main shaft 7 (see FIGS. 1 and 4).

Figure 2:
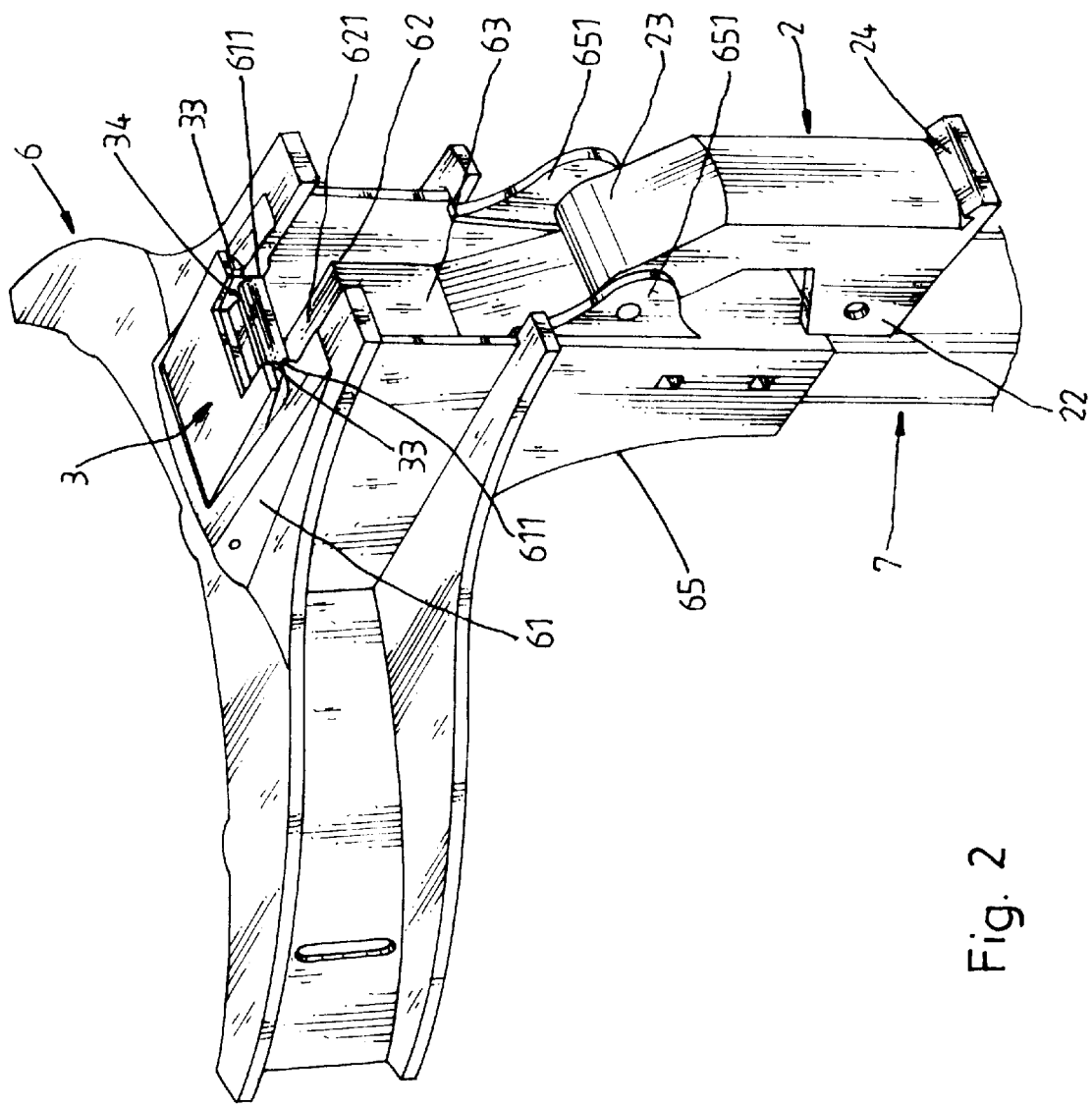
FIG. 2 is similar to FIG. 1 but showing the handle bracket turned out of the receiving chamber of the upper bag cradle.
Figure 5:
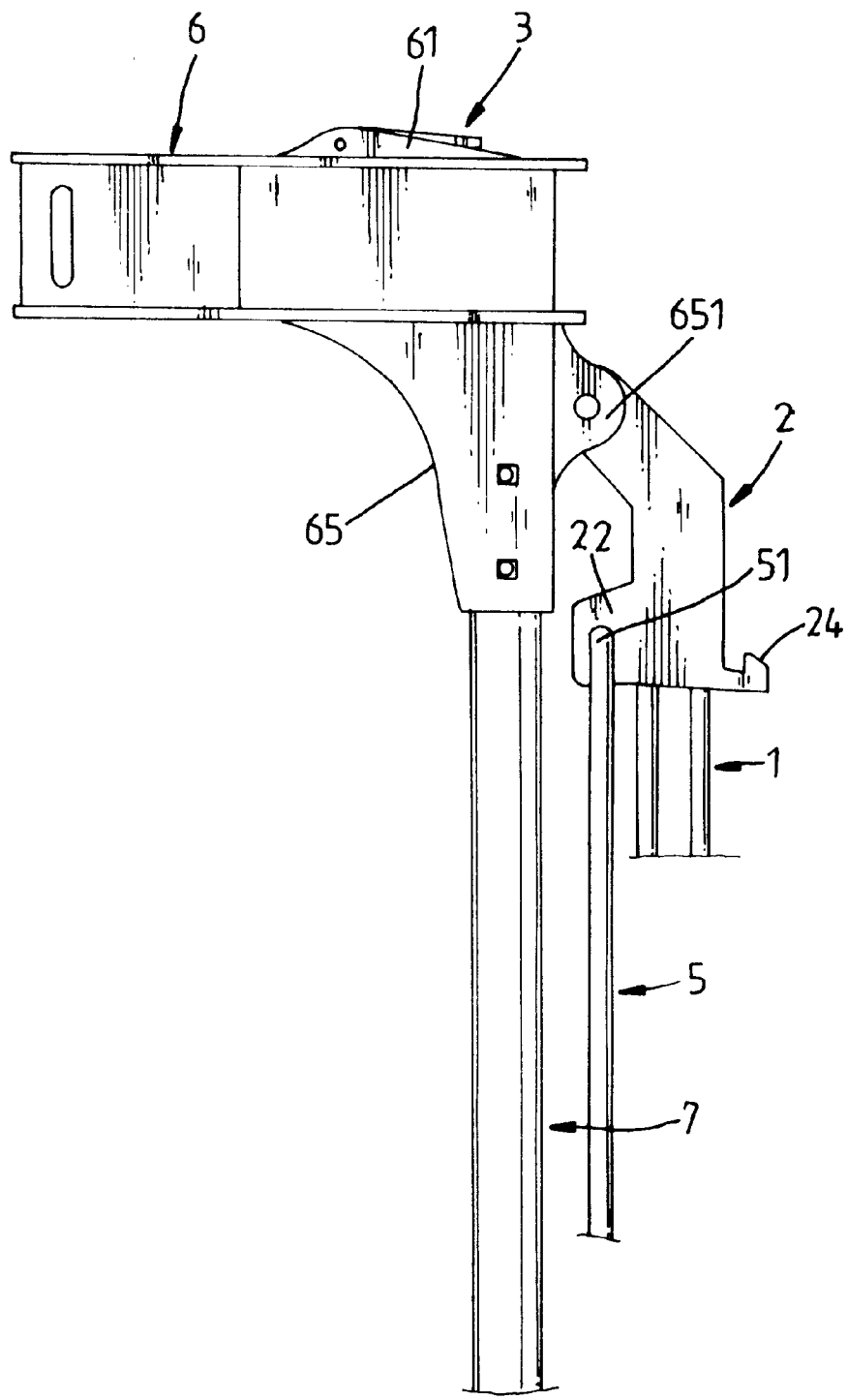
FIG. 5 is another side view of the present invention, showing the folding collapsible frame assembly collapsed.

When collapsing the folding collapsible frame assembly, the locating block 3 is pressed down to disengage the locating groove 34 of the locating block 3 from the locating flange 24 of the handle bracket 2, then the handle bracket 2 is turned out of the receiving chamber 63 and retained in parallel to the main shaft 7, and at the same time the links 5 and the wheel holder bracket 4 are collapsed (see FIGS. 2 and 5). When the handle bracket 2 is turned back into the receiving chamber 63, the locating flange 24 is forced into engagement with the locating groove 34 on the locating block 3, and therefore the locating flange 24 is retained in the operative position to hold the handle bar 1 in longitudinal alignment with the main shaft 7 again.

It is claimed:

1. A folding collapsible frame assembly comprising a handle bar, a handle bracket, a locating block, a main shaft, a wheel holder bracket, two links, an upper bag cradle, and a lower bag cradle, said handle bar having a bottom end fixedly connected to said handle bracket, said handle bracket comprising a coupling hole which receives the bottom end of said handle bar, two parallel lugs raised from a rear side thereof to which said links are respectively pivoted, a coupling portion at a front side thereof pivoted to said upper bag cradle, and a locating flange for engagement with said locating block, said upper bag cradle and said lower bag cradle being respectively fastened to front and rear ends of said main shaft, said wheel holder bracket being fixedly fastened to said main shaft and spaced between said upper bag cradle and said lower bag cradle, said wheel holder bracket having two parallel lugs, said links each having a front end respectively pivoted to the lugs of said handle bracket and a rear end respectively pivoted to the lugs of said wheel holder bracket, wherein: said upper bag cradle comprises two longitudinal mounting walls arranged in parallel at a front side thereof to which said locating block is pivoted, a transverse inside wall, an opening surrounded by said longitudinal mounting walls and said transverse inside wall which receives said locating block, a rod raised from said transverse inside wall within said opening, a spring mounted on said rod to support said locating block, two stop flanges respectively perpendicularly raised from said longitudinal mounting walls to limit the turning angle of said locating block, a receiving chamber at a bottom side thereof in communication with said opening for receiving said handle bracket, a shell at a back side thereof fastened to the front end of said main shaft, and two parallel lugs integral with said shell at one end of said receiving chamber to which the coupling portion said handle bracket is pivoted; said locating block comprises a front end pivotably connected between the longitudinal mounting walls of said upper bag cradle by pivot means, a locating groove at a rear end thereof, a bottom side wall supported on said spring, and two stop flanges bilaterally disposed at the rear end, the stop flanges of said locating block being stopped by the stop flanges of said upper bag cradle to limit the upward turning angle of said locating block; the coupling portion of said handle bracket can be turned with said handle bracket about said pivoted means within 180° between a first position where said locating flange of said handle bracket is forced into engagement with the locating groove of said locating block, enabling said handle bracket to be retained received in said receiving chamber, and a second position where said handle bracket is moved out of said receiving chamber and retained in parallel to said main shaft.

* * * * *